(12) United States Patent
Kurokawa et al.

(10) Patent No.: US 9,990,444 B2
(45) Date of Patent: Jun. 5, 2018

(54) APPARATUS AND METHOD FOR SUPPORTING VISUALIZATION OF CONNECTION RELATIONSHIP

(71) Applicant: International Business Machines Corporation, Armonk, NY (US)

(72) Inventors: Hiroshi Kurokawa, Tokyo (JP); Takahisa Mizuno, Tokyo (JP); Tomohiro Shioya, Tokyo (JP); Sayaka Tamai, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 14/679,288

(22) Filed: Apr. 6, 2015

(65) Prior Publication Data
US 2016/0117352 A1 Apr. 28, 2016

(30) Foreign Application Priority Data
Feb. 26, 2014 (JP) .................. 2014-035929

(51) Int. Cl.
*G06F 17/30* (2006.01)
(52) U.S. Cl.
CPC .............. *G06F 17/30991* (2013.01)
(58) Field of Classification Search
CPC ................................. G06F 17/30991
See application file for complete search history.

(56) References Cited

U.S. PATENT DOCUMENTS

| | | | | |
|---|---|---|---|---|
| 5,546,529 | A * | 8/1996 | Bowers | G06F 17/30991 707/E17.141 |
| 6,434,556 | B1 * | 8/2002 | Levin | G06F 17/30696 |
| 2004/0210829 | A1 * | 10/2004 | Cristofari | G06F 17/30899 715/205 |
| 2005/0050029 | A1 * | 3/2005 | Suzuki | G06F 17/3089 |
| 2008/0049609 | A1 * | 2/2008 | Chao | H04L 12/66 370/218 |

(Continued)

FOREIGN PATENT DOCUMENTS

| | | |
|---|---|---|
| JP | 11265357 A | 3/1998 |
| JP | H11-327994 A | 11/1999 |

(Continued)

*Primary Examiner* — Jared M Bibbee
(74) *Attorney, Agent, or Firm* — Joseph Polimeni; Edell, Shapiro & Finnan, LLC

(57) ABSTRACT

In a search server, a page collection unit collects Internet pages. An index generation unit generates an index of the pages. An index-tree generation unit generates an index tree representing the connection relationship among the pages in a tree structure, and in which a page linked from multiple pages is represented by different nodes in a duplicated manner. When a search word input unit inputs a search word in a client, a search-result generation unit of the search server generates a search result on the basis of the index. For the index tree, a search-result-tree generation unit, for example, highlights nodes containing the search word, and deletes nodes, each of which does not contain the search word and is not a branch point into multiple branches which contain the search word. The search-result-tree generation unit outputs the resulting search result to a search result display unit of the client.

20 Claims, 15 Drawing Sheets

(56) References Cited

U.S. PATENT DOCUMENTS

| | | | |
|---|---|---|---|
| 2009/0083261 A1* | 3/2009 | Nagano | G06F 17/30864 |
| 2009/0125472 A1* | 5/2009 | Houchi | G06Q 10/00 |
| | | | 706/50 |
| 2009/0234802 A1* | 9/2009 | Shinjo | G06F 7/02 |
| 2009/0235153 A1* | 9/2009 | Otsuka | G06F 17/2235 |
| | | | 715/208 |
| 2010/0058118 A1* | 3/2010 | Yamaoka | G06F 9/4443 |
| | | | 714/48 |
| 2010/0198845 A1* | 8/2010 | Kutsch | G06F 17/30941 |
| | | | 707/755 |
| 2010/0250631 A1 | 9/2010 | Kawaharada | |
| 2011/0295845 A1* | 12/2011 | Gao | G06F 17/30864 |
| | | | 707/723 |
| 2012/0166425 A1* | 6/2012 | Sharma | G06F 17/30696 |
| | | | 707/722 |
| 2012/0166440 A1* | 6/2012 | Shmueli | G06F 17/30625 |
| | | | 707/737 |
| 2014/0229473 A1* | 8/2014 | Mehrotra | G06F 17/30011 |
| | | | 707/728 |
| 2014/0250377 A1* | 9/2014 | Bisca | G06F 17/30011 |
| | | | 715/705 |

FOREIGN PATENT DOCUMENTS

| | | |
|---|---|---|
| JP | 2000222436 A | 8/2000 |
| JP | 2001125931 A | 5/2001 |
| JP | 2001282604 A | 10/2001 |
| JP | 2002245041 A | 8/2002 |
| JP | 2004192113 A | 7/2004 |
| JP | 2004-264928 A | 9/2004 |
| JP | 2008158884 A | 7/2008 |
| JP | 2010231475 A | 10/2010 |
| JP | 2012-515382 A | 7/2012 |

\* cited by examiner

APPARATUS AND METHOD FOR SUPPORTING VISUALIZATION OF CONNECTION RELATIONSHIP

BACKGROUND

The present invention relates to an apparatus and a method for supporting visualization of a connection relationship. In particular, the present invention relates to an apparatus and a method for supporting visualization of a connection relationship among multiple components.

Use of, for example, a dynamic page which is automatically generated by using programs every time the page is loaded has made the structure in a website complicated so that the structure is not easily grasped. If the structure in a website is not grasped, it is difficult to know where a web page of interest is present in the website.

This causes a specific problem to arise, for example, when a search result based on a search request to web pages is displayed. Use of a search engine makes it easy to find web pages satisfying a search request. However, in display of the found web pages, information about where the web pages are located in the website fails to be utilized. That is, information related to a search result fails to be systematically obtained.

A technique of displaying the structure in a website is known as a technique described in patent literatures (for example, see Japanese Patent Application Publication No. 11-327994).

In Japanese Patent Application Publication No. 11-327994, a method for displaying the change with time in the structure, the use, and the information of a website in an orderly manner is disclosed. Many links are present in a large generalized graph structure. Therefore, displaying of all of the links is often unpractical. Accordingly in this method, when a visual representation of a generalized graph structure is presented to a user, a tree structure is used to display only a subset of all of the links which are present in the generalized graph structure.

A technique of presenting the structure of web pages and a website as a search result is also known as a technique described in patent literatures (for example, see Japanese Patent Application Publication Nos. 2004-264928 and 2012-515382).

In Japanese Patent Application Publication No. 2004-264928, a method for performing searching in a website is disclosed. In the method, web pages are collected and classified on the basis of sites in advance, and a tree structure for each of the sites is determined. The tree structure is stored in a DB along with the relationship between each of the web pages and the site. A site search engine performs site retrieval in the DB for web pages which have been hit on the basis of a site search request. A site search result generation/navigation unit generates a site search result having a navigation button for presenting the internal structure in the site, as a link, and transmits it to a site search terminal. When the link is transmitted from the site search terminal, the site tree structure in the site is obtained from the DB, and is transmitted to the site search terminal. On the basis of this, the site search terminal performs highlighting which indicates the pages which have been hit, and generates and displays an initial site map.

In Japanese Patent Application Publication No. 2012-515382, a technique is disclosed which relates to methods including computer program products, systems, and apparatuses for attaching a visual representation of hierarchical data associated with resources specified by a search system to the resources. The resources and the hierarchical data may be presented to a user as a search result. The visual representation of the hierarchical data may be presented in the form of breadcrumbs, a drop-down list, or a tree-structure navigation menu.

Thus, traditional techniques of representing the structure in a website in a tree structure have been devised.

However, in the technique disclosed in Japanese Patent Application Publication No. 11-327994, in representation of the structure in a website in a tree structure, a web page linked from multiple web pages is not represented by different nodes in a duplicated manner. The author of the website may employ a structure in which multiple web pages are linked to the same web page, with some intention. The technique has a problem in that the intention with which the author employs such a structure is difficult to be clear.

In the techniques disclosed in Japanese Patent Application Publication Nos. 2004-264928 and 2012-515382, the structure of web pages and a website is presented as a search result. However, it is assumed that a website has a structure which can be represented in a tree structure. Therefore, the techniques are not those in which a web page linked from multiple web pages is represented by different nodes in a duplicated manner. Accordingly, the techniques disclosed in Japanese Patent Application Publication Nos. 2004-264928 and 2012-515382 do not solve the above-described problem.

This problem may arise not only in representation of a connection relationship among web pages which represents the structure in a website, but also in representation of a connection relationship among any components, such as a relationship between users of a social networking service (SNS), e.g., a relationship between a user and his/her follower, and a reference relationship between documents such as papers.

SUMMARY

An aspect of the present invention is to grasp the intention of an author who creates a connection relationship among multiple components, and to easily specify a component group of interest.

Another aspect of the present invention is to represent a connection relationship among multiple components in accordance with the intention of an author who creates this connection relationship.

Yet another aspect of the present invention is to present a search result based on a search request to multiple components, by using a representation of data which is made in accordance with the intention of an author who creates the connection relationship among the multiple components.

The present invention provides an apparatus for supporting visualization of a connection relationship among multiple components. The apparatus includes a recognition unit and a generation unit. The recognition unit recognizes the connection relationship among the components. The connection relationship includes a connection from a first component to at least two components and a connection from at least a second component and a third component to a single component. The generation unit generates tree structure data in which the connection relationship is represented in a tree structure, by associating the first component with a first node, by associating the at least two components with at least two child nodes of the first node, respectively, by associating the second component with a second node, by associating the third component with a third node different from the second node, and by associating the single component with a child node of the second node and with a child node of the third node in a duplicated manner.

This apparatus may further include a specification unit and a processing unit. The specification unit specifies, in response to a search request to multiple components, multiple matching nodes associated with multiple satisfying components, respectively, which satisfy the search request, among multiple nodes in the tree structure data. The processing unit processes the tree structure data so as to visualize the tree structure data in such a manner that the matching nodes are identifiable. In this case, the processing unit may process the tree structure data so as to visualize the tree structure data in such a manner that one or more nodes are deleted. Each of the deleted nodes is a node which is not included in the matching nodes and which is not a branch point into multiple branches, each of which contains any node among the matching nodes. Alternatively, the processing unit may process the tree structure data so as to visualize the tree structure data in such a manner that a node, which is a branch point into multiple branches, each of which contains a selected matching node among the matching nodes, is identifiable.

In addition, the present invention provides an apparatus for supporting visualization of a search result based on a search request to multiple components. The apparatus includes a storage unit, a specification unit, and a processing unit. The storage unit stores tree structure data representing a connection relationship among the components in a tree structure. The connection relationship includes a connection from a first component to at least two components and a connection from at least a second component and a third component to a single component. The tree structure data is made by associating the first component with a first node, by associating the at least two components with at least two child nodes of the first node, respectively, by associating the second component with a second node, by associating the third component with a third node different from the second node, and by associating the single component with a child node of the second node and with a child node of the third node in a duplicated manner. The specification unit specifies, in response to a search request, multiple matching nodes associated with multiple satisfying components which satisfy the search request, among multiple nodes in the tree structure data. The processing unit processes the tree structure data so as to visualize the tree structure data in such a manner that the matching nodes are identifiable.

Further, the present invention provides an apparatus for supporting visualization of a search result based on a search request to multiple web pages. The apparatus includes a recognition unit, a generation unit, a specification unit, and a processing unit. The recognition unit recognizes a connection relationship among the web pages. The connection relationship includes a connection from a first web page to at least two web pages and a connection from at least a second web page and a third web page to a single web page. The generation unit generates tree structure data representing the connection relationship in a tree structure, by associating the first web page with a first node, by associating the at least two web pages with at least two child nodes of the first node, respectively, by associating the second web page with a second node, by associating the third web page with a third node different from the second node, and by associating the single web page with a child node of the second node and with a child node of the third node in a duplicated manner. The specification unit specifies, in response to a search request to multiple web pages, multiple matching nodes associated with multiple satisfying web pages which satisfy the search request, among multiple nodes in the tree structure data. The processing unit processes the tree structure data so as to visualize the tree structure data in such a manner that the matching nodes are identifiable and that one or more nodes are deleted. Each of the deleted nodes is a node which is not included in the matching nodes and which is not a branch point into multiple branches, each of which contains any node among the matching nodes.

In addition, the present invention provides a method for supporting visualization of a connection relationship among multiple components. The method includes the steps of: recognizing the connection relationship among the components, the connection relationship including a connection from a first component to at least two components and a connection from at least a second component and a third component to a single component; and generating tree structure data in which the connection relationship is represented in a tree structure, by associating the first component with a first node, by associating the at least two components with at least two child nodes of the first node, respectively, by associating the second component with a second node, by associating the third component with a third node different from the second node, and by associating the single component with a child node of the second node and with a child node of the third node in a duplicated manner.

Further, the present invention provides a program product for causing a computer to function as an apparatus for supporting visualization of a connection relationship among multiple components. The program product causes the computer to function as a recognition unit and a generation unit. The recognition unit recognizes the connection relationship among the components. The connection relationship includes a connection from a first component to at least two components and a connection from at least a second component and a third component to a single component. The generation unit generates tree structure data in which the connection relationship is represented in a tree structure, by associating the first component with a first node, by associating the at least two components with at least two child nodes of the first node, respectively, by associating the second component with a second node, by associating the third component with a third node different from the second node, and by associating the single component with a child node of the second node and with a child node of the third node in a duplicated manner.

DETAILED DESCRIPTION

An embodiment of the present invention will be described in detail below with reference, to the attached drawings. The present invention enables the intention of an author who creates a connection relationship among multiple components to be grasped, and enables a component group of interest to be easily specified. A present embodiment aims to provide a search system which displays a search result based on a search request to web pages (hereinafter, simply referred to as "pages").

For example, assume that searching is performed in the website of ABC Corp. A user wants to read system requirements for each of the versions of a software product developed by ABC Corp., Content Analytics (CA), which is used to perform searching and text mining.

Figure 1:
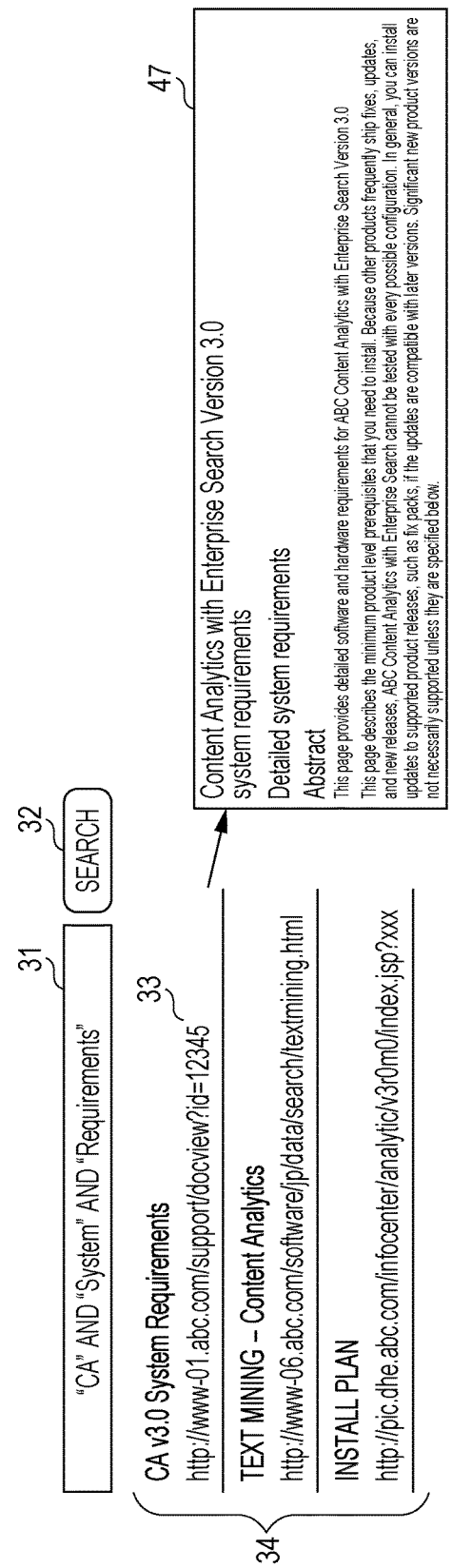
FIG. 1 is a diagram illustrating an example typical search screen obtained when searching is performed in a certain website.

FIG. 1 is a diagram illustrating an example search screen obtained through the searching. The user inputs a query, "CA" AND "System" AND "Requirements", in a search box 31, and clicks a search button 32, thereby performing searching. Then, a search result 33 about version 3.0 of CA, which is a new version, is displayed at the top of a search result list 34. Accordingly, the user clicks the search result 33, and views a page 47 about version 3.0 of CA. In contrast, search results about older versions of CA may be included in the search result list. However, their rankings in the search result are low. Therefore, the older versions fail to be checked in the search result list 34. That is, the user can view the page 47 about version 3.0 of CA, but does not find the way of viewing pages about the other versions of CA.

To read the system requirements about each of the versions of CA, the version number may be added to the query, and searching may be pert:brined again. However, to perform such searching, a user needs to know all of the version numbers. Even if the user knows all of the version numbers, searching of the versions one by one is a troublesome task.

In addition, for example, if the product name has been changed, e.g., the official name of CA has been changed from Content Analyzer to Content Analytics, a desired search result may fail to be obtained through searching using the current product name.

In this case, the user may try to find a page about the other versions of CA by following the links from the page 47 obtained through the searching.

Figure 2:
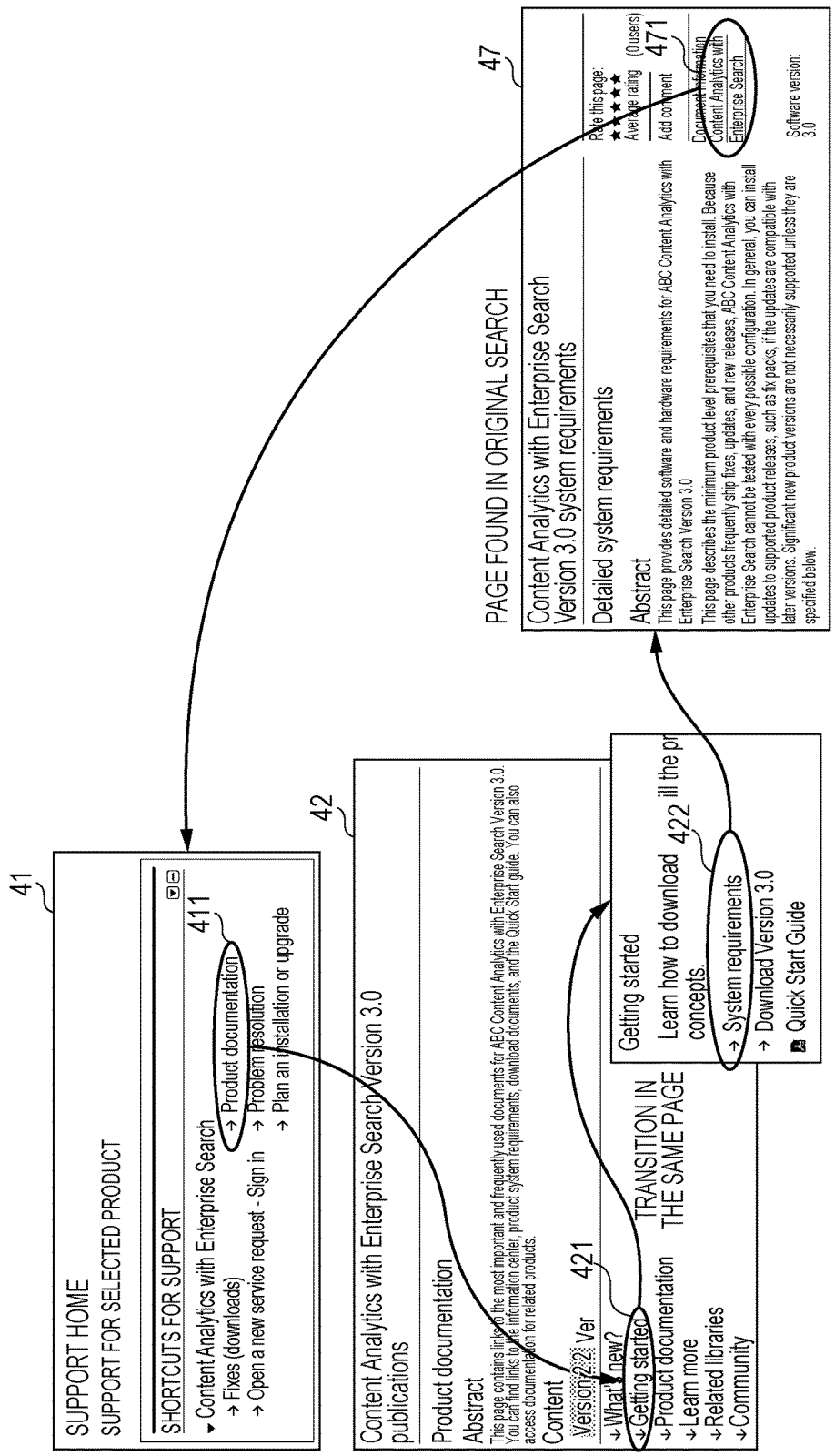
FIG. 2 is a diagram illustrating example transitions between pages which are made when searching for another page from a page found in a search is performed.

FIG. 2 is a diagram illustrating example transitions between pages at that time. First, the user may want to find a page in which pages about respective versions are listed. For example, the page 47 contains a link 471 to "Document Information". The user clicks the link 471. Then, the user jumps to a page 41 about support of the selected product. After that, clicking of a link 411 causes a page 42 to be displayed; clicking of a link 421 causes a transition in the page; and then, clicking of a link 422 causes the user to return back to the page 47 which is the starting page. That is, if a user does not know the overall structure of the website, it is difficult to find pages about the other versions of CA by following the links.

Accordingly, in a present embodiment, information contained in the structure in a website is reflected in the search result.

Figure 3:
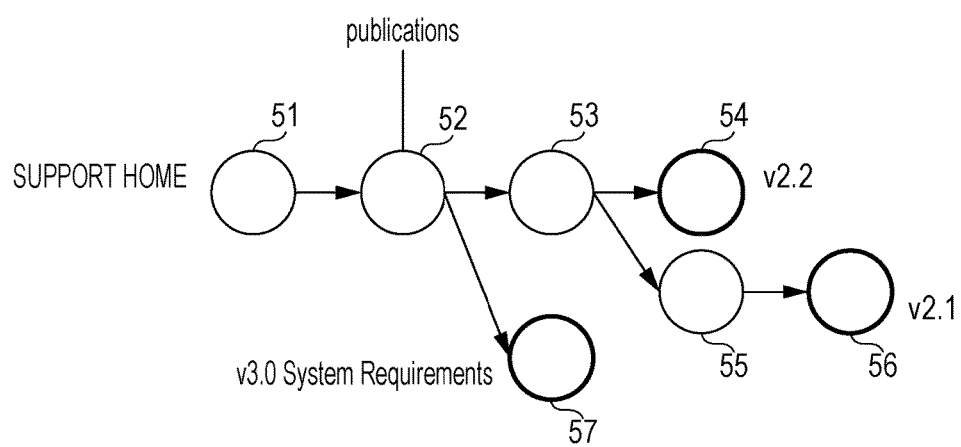
FIG. 3 is a diagram illustrating an example display of a search result in which information contained in the structure in a website is reflected, according to the present embodiment.

FIG. 3 illustrates an example display of the search result in this case. As illustrated in FIG. 3, a node 52 corresponding to the page 42 is present as a child node of a node 51 corresponding to the page 41, and a node 57 corresponding to the page 47 is present as a child node of the node 52. This indicates that links can be followed from the page 41 via the page 42 to the page 47. On the other hand, a node 53 is present as a child node of the node 52; and a node 54 corresponding to a page about version 2.2 of CA is present as a child node of the node 53; and a node 56 corresponding to a page about version 2.1 of CA is present as a child node of a node 55 which is a child node of the node 53. When a search result in which the structure in a website is reflected is thus displayed, the locations, in the website, of the pages about the other versions of CA are easily found. Such locations fail to be found through the operation of following the links as illustrated in FIG. 2.

Even in the same target page, the information which is desirably conveyed to a user is changed depending on a page from which the target page is linked. Therefore, by displaying the structure in the website, the intention of the author of the website may be clear.

Further, by combining the site structure and a search result into a single piece of display information, a page group of a user's interest is easily found. The search result in FIG. 3 may be displayed instead of the search result list 34 in FIG. 1, or may be displayed with the search result list 34 in FIG. 1.

Typically, the structure in a website is represented in a network structure. In the present embodiment, the network structure is converted into a tree structure. The conversion into a tree structure is performed as follows. That is, a top page is associated with a root node, and a page linked from a higher-level page is associated with a child node of a node corresponding to the higher-level page. At that time, even in the case where a node corresponding to a linked-to page is already present in the tree structure, when the node is not present among ancestors of a node corresponding to a linked-from page, the node corresponding to the linked-to page is added as a child node of the node corresponding to the linked-from page. When the node corresponding to the linked-to page is present among the ancestors of the node corresponding to the linked-from page, no further processing is performed.

Figure 4A:
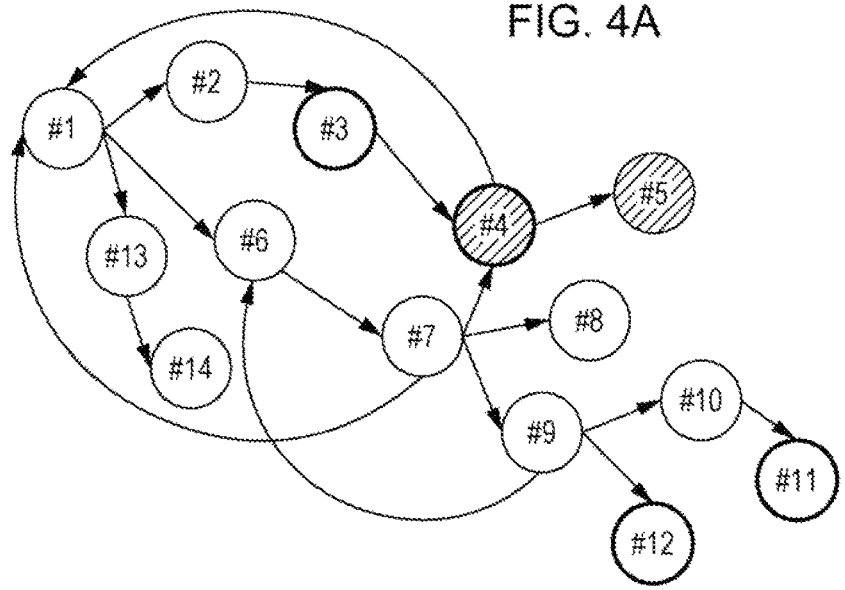
FIG. 4A is a diagram illustrating an example network structure representing the structure in a website, according to the present embodiment.
Figure 4B:
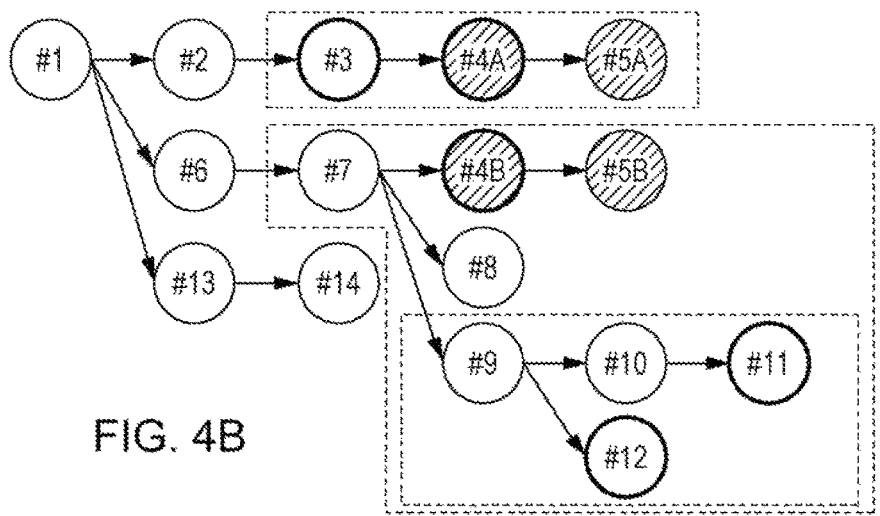
FIG. 4B is a diagram illustrating an example tree structure representing the structure in a website, according to the present embodiment.

FIGS. 4A and 4B are diagrams illustrating an example conversion from a network structure representing the structure in a website into a tree structure. In FIGS. 4A and 4B, a node surrounded with a bold line represents a node corresponding to a page which has been hit by a query, and a hatched node represents a node corresponding to a duplicated page.

FIG. 4A illustrates an example network structure representing the structure in a website. FIG. 4A illustrates nodes #1 to #12 corresponding to pages #1 to #12, respectively, included in the website. The types of a link between nodes include a link from one node to multiple nodes, a link from multiple nodes to one node, and a link from a node to an ancestor node thereof.

FIG. 4B illustrates an example tree structure representing the structure in the website. FIG. 4B also illustrates the nodes #1 to #12 corresponding to the pages #1 to #12, respectively, included in the website. Since the node #4 is linked from the node #3 and the node #7 in FIG. 4A, nodes corresponding to the page #4 are illustrated in a duplicated manner as shown by the hatching in FIG. 4B. For the sake of convenience, a child node of the node #3 is illustrated as a node #4A, and a child node of the node #7 is illustrated as a node #4B. Also, since the node #5 is a child node of the node #4, nodes corresponding to the page #5 are illustrated in a duplicated manner as shown by the hatching. For the sake of convenience, a child node of the node #4A is illustrated as a node #5A, and a child node of the node #4B is illustrated as a node #5B. The types of a link between nodes include a link from one node to multiple nodes, but exclude a link from a node to an ancestor node thereof.

The tree structure is used to find a page group of a user's interest. In FIG. 4B, examples of such a page group are illustrated by using a dashed line. Various page groups may be found, and a user may find any page group in accordance with his/her purpose.

The tree structure is displayed in order that a user finds a page group of interest. Accordingly, improvements are made in accordance with the purpose.

In a first improvement, a part of a tree structure which is not necessary in finding a page group of a user's interest is deleted. Thus, the tree structure is compressed so that the search result is efficiently visualized.

Figure 5A:
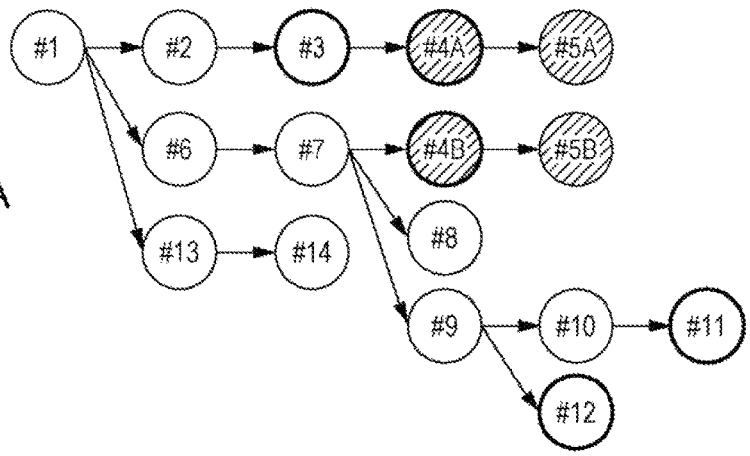
FIG. 5A is a diagram illustrating an example tree structure representing the structure in a website, according to the present embodiment.
Figure 5B:
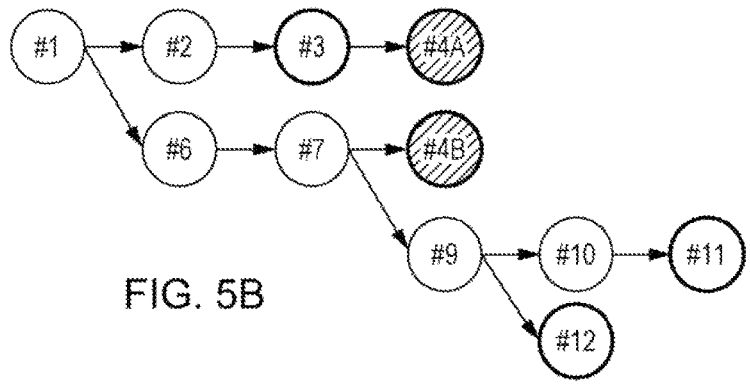
FIG. 5B is a diagram illustrating an example tree structure obtained after the tree structure is compressed by deleting leaves.
Figure 5C:
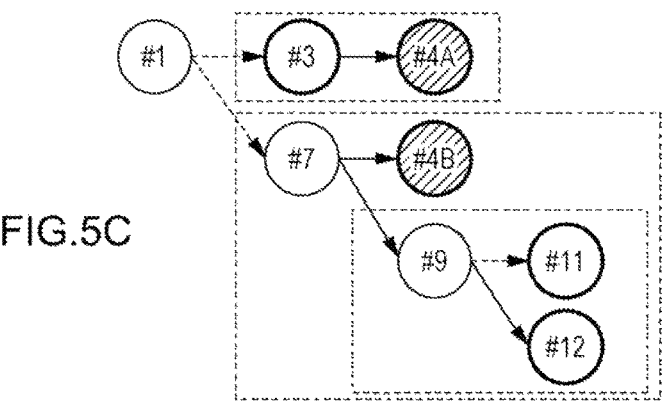
FIG. 5C is a diagram illustrating an example tree structure obtained after the tree structure is compressed by deleting intermediate nodes.

FIGS. 5A to 5C are diagrams illustrating an example of such compression of a tree structure.

FIG. 5A illustrates a tree structure just after the conversion from the network structure. The tree structure is subjected to deletion of leaves which do not correspond to pages which are hit by the query, so that all of the leaves correspond to the pages which are hit by the query. At that time, when deletion of a child node causes its parent node to become a leaf, such a leaf is deleted in a chained manner.

FIG. 5B illustrates a tree structure just after the leaves are deleted. In FIG. 5B, the nodes #5A, #5B, #8, #13, and #14 illustrated in FIG. 5A are deleted. Then, the tree structure is subjected to an operation of deleting intermediate nodes, each of which does not correspond to a page which is hit by the query and which is not a branch point into multiple branches including a node corresponding to a page which is hit by the query.

FIG. 5C illustrates a tree structure just after the intermediate nodes are deleted. In FIG. 5C, the nodes #2, #6, and #10 illustrated in FIG. 5B are deleted. When an intermediate node is deleted, a display indicating the deletion may be made. In FIG. 5C, a link between nodes before and after a deleted intermediate node is displayed by using a dotted-line arrow. An operation performed by a user may cause the tree structure before the deletion to be displayed. In FIG. 5C, examples of a page group of a user's interest are displayed by using a dashed line. Thus, nodes which are not related to the query are omitted, allowing a page group to be easily found.

In a second improvement, assistance with specification of a page group is provided.

Such assistance with specification of a page group may be provided by highlighting an ancestor node which is the closest one among common ancestors of selected nodes.

Figure 6:
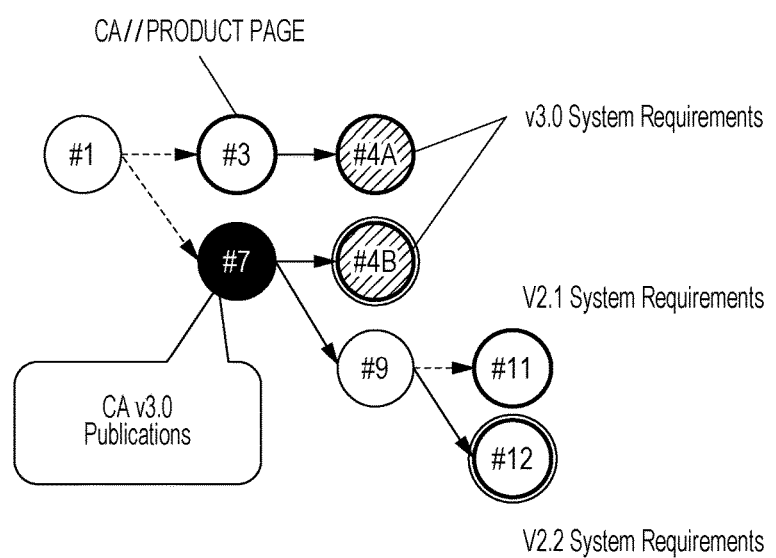
FIG. 6 is a diagram illustrating example highlighting of a common ancestor node of selected nodes, according to the present embodiment.

FIG. 6 is a diagram illustrating example highlighting in a tree structure. In FIG. 6, among the nodes #3, #4A, #4B, #11, and #12 which correspond to pages that are hit by the query and which are surrounded with a bold line, the nodes #4B and #12 which are surrounded with a solid line outside of the bold line are selected. As illustrated as a black node, the node #7 which is a common ancestor node of these nodes is highlighted. When the common ancestor node is clicked, as illustrated in a balloon, the title of the page represented by the node may be displayed. Thus, a user can recognize the type of the page group represented by a node group of interest.

Assistance with specification of a page group may be also provided by displaying information about which node represents which page. For example, when a node is selected or pointed out, information for specifying a page (for example, the page title) is displayed. Instead, nodes representing pages which are hit by a query are highlighted so as to be differentiated from the other nodes. At that time, the degree of highlighting may be changed by using color, density, or the like in accordance with a search score.

An example of using such a tree structure is an operation of narrowing down a search result tree by specifying a page group. Specifically, a user performs an operation on a certain node so as to narrow down a search result tree.

Figure 7:
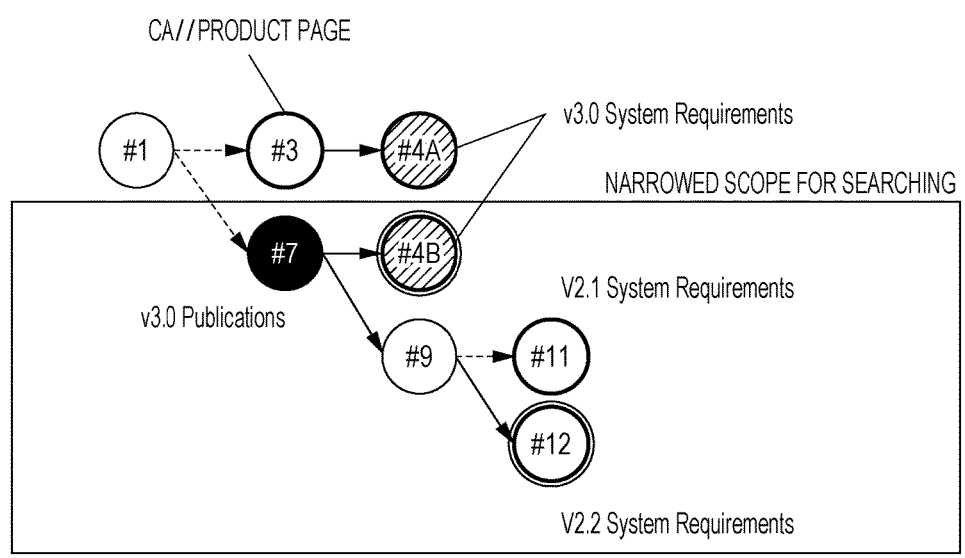
FIG. 7 is a diagram illustrating an example in which a search result tree is narrowed down, according to the present embodiment.

FIG. 7 is a diagram illustrating an example in which a search result tree is narrowed down. In FIG. 7, a user performs an operation on the node #7 so as to narrow down the search result tree to the scope surrounded with a solid line. For example, when a user moves the pointer to the node #7 and right-clicks with a mouse, a menu is displayed. This menu includes an option of "select node group including this node and its child nodes". Thus, the user selects this option. After that, the user performs an operation of changing the query which is input in the search box 31 illustrated in FIG. 1, such as an operation of adding an AND condition. The user clicks the search button 32 illustrated in FIG. 1 so as to perform searching again. When it is not necessary to change the query, an option "select node group including this node and its child nodes, and search again" which is provided in the menu may be selected. Thus, a narrowing-down operation can be visually performed so that a page group of a user's interest is obtained. That is, a narrowing-down operation can be easily performed compared with the case in which a query using only characters is used.

Figure 8:
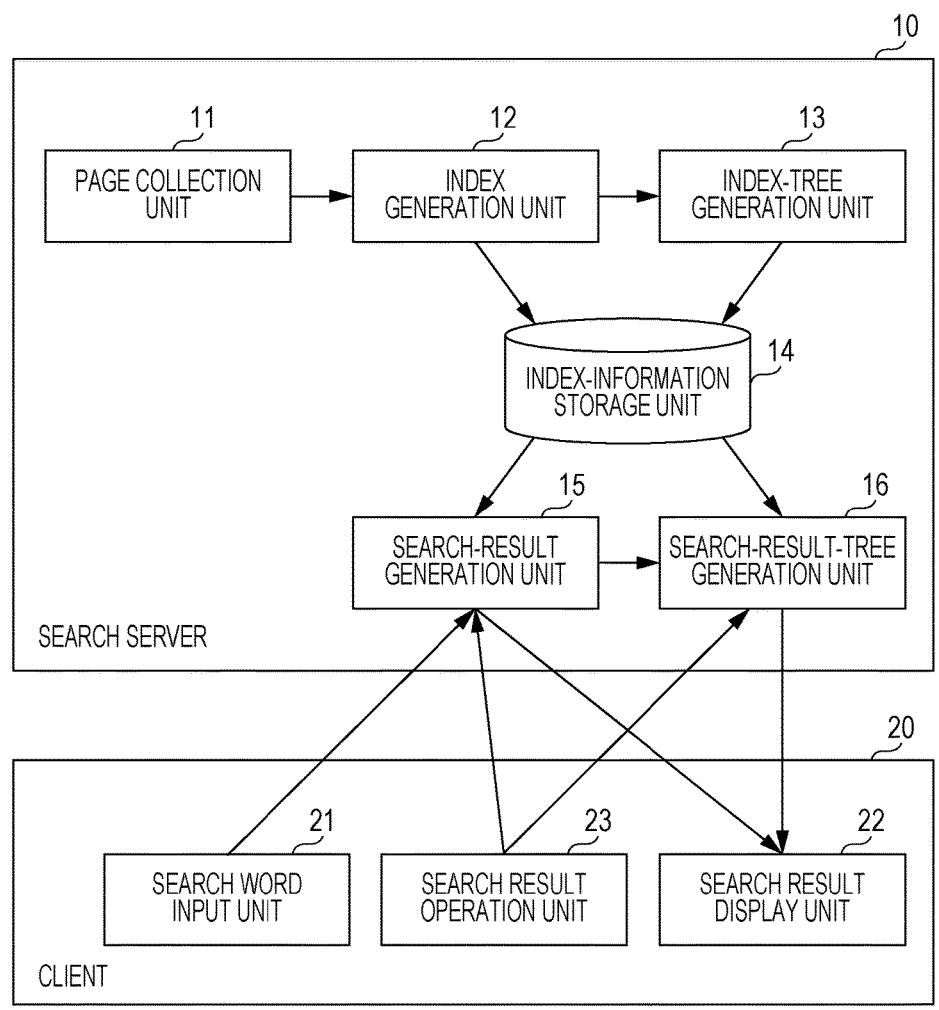
FIG. 8 is a block diagram illustrating an example functional configuration of a search system according to an embodiment of the present invention.

FIG. 8 is a diagram illustrating an example functional configuration of the search system according to the present embodiment. As illustrated in FIG. 8, the search system includes a search server 10 and a client 20. The search server 10 is a server computer which holds an index of pages on the Internet. When a query is received from the client 20, the search server 10 searches the index, and returns a search result. The client 20 is a computer terminal which inputs a query to the search server 10 and which receives a search result based on the query from the search server 10 so as to display the search result. The query may include various search conditions, such as a search word, the last update date and time, and a file format. The description below will be made under the assumption that the query is one including a search word as illustrated in FIG. 1 and that the client 20 inputs the search word.

The search server 10 includes a page collection unit 11, an index generation unit 12, an index-tree generation unit 13, an index-information storage unit 14, a search-result generation unit 15, and a search-result-tree generation unit 16.

The page collection unit 11 collects multiple pages which are to be searched on the Internet. In the present embodiment, the page collection unit 11 collects multiple pages included in a website of interest.

The index generation unit 12 analyzes the multiple pages collected by the page collection unit 11, so as to generate an index of these pages. The index may be one in which a word is associated with a uniform resource locator (URL) of a page including the word. Instead, data in which a word is associated with the page ID for identifying a page including the word in the system may be generated as an index, and another data in which the page ID is associated with a URL may be stored. However, for the sake of simplicity, an index in which a word is associated with a URL is generated in the present embodiment. The index generation unit 12 also extracts link information representing the link relationship among the pages collected by the page collection unit 11 (for example, a correspondence between the source URL of a link and the destination URL of the link), In the present embodiment, multiple pages are used as example components; a link relationship is used as an example connection relationship among the components; and the index generation unit 12 is used as an example recognition unit which recognizes the connection relationship.

The index-tree generation unit 13 generates an index tree on the basis of the index generated by the index generation unit 12 and the link information extracted by the index generation unit 12. Specifically, the index-tree generation unit 13 generates a tree structure including nodes which contain the URLs of the pages, on the basis of the link information extracted by the index generation unit 12. Then, the index-tree generation unit 13 attaches words associated with a URL in the index generated by the index generation unit 12, to a node which contains the URL and is included in the tree structure. Instead of attaching words to a node, the node may be associated with the index. When searching is performed, the index may be referred to. In the present embodiment, for the sake of simplicity, words are attached to a node. In the present embodiment, an index tree is used as example tree structure data representing the connection relationship in a tree structure, and the index-tree generation unit 13 is used as an example generation unit which generates tree structure data.

The index-information storage unit 14 is a database for storing the index generated by the index generation unit 12 and the index tree generated by the index-tree generation unit 13, as index information. In the present embodiment, the index-information storage unit 14 is used as an example storage unit for storing tree structure data.

The search-result generation unit 15 searches the index stored in the index-information storage unit 14, for a search word which is input from the client 20, and generates a search result. At that time, the search-result generation unit 15 may determine a search scope from the index tree stored in the index-information storage unit 14 on the basis of a user operation performed on the search result tree in the client 20, and may generate a search result in the search scope. The search result may contain a list of URLs associated with the search word, which is received from the client 20, in the index stored in the index-information storage unit 14. The search-result generation unit 15 outputs the search word received from the client 20, also to the search-result-tree generation unit 16.

The search-result-tree generation unit 16 generates a search result tree on the basis of the index tree stored in the index-information storage unit 14 and the search word received from the search-result generation unit 15. The search result tree thus generated may be one, for example, in which nodes containing the search word are highlighted or one in which nodes which do not contain the search word and each of which is not a branch point into multiple branches including the search word is deleted, as illustrated in FIGS. 5A to 5C. Instead, the search-result-tree generation unit 16 may generate a search result tree when a user operation is performed on the search result tree in the client 20. The search result tree thus generated may be one in which, when a user selects multiple nodes, a common ancestor node of the selected nodes is highlighted, as illustrated in FIG. 6. The search-result-tree generation unit 16 outputs the generated search result tree to the client 20. In the present embodiment, a search word is used as an example search request; a page containing a search word is used as an example satisfying component which satisfies a search request; a node containing a search word is used as an example matching node corresponding to a satisfying component; and the search-result-tree generation unit 16 is used as an example specification unit which specifies a matching node. A highlighted node containing a search word is used as an example identifiable matching node; a branch point into multiple branches including a search word is used as an example branch point into at least two branches; a highlighted common ancestor node is used as an example identifiable node being a branch point; and the search-result-tree generation unit 16 is used as an example processing unit which processes tree structure data.

The client 20 includes a search word input unit 21, a search result display unit 22, and a search result operation unit 23.

When a search word, which is assumed to be contained in a page to be searched, is input by using a keyboard/mouse 20i, the search word input unit 21 inputs the search word to the search-result generation unit 15 of the search server 10.

When a search result generated by the search-result generation unit 15 and a search result tree generated by the search-result-tree generation unit 16 of the search server 10 are received from the search server 10, the search result display unit 22 displays these pieces of information by using a display mechanism 20d.

When a user performs an operation, by using the keyboard/mouse 20i, on the search result tree displayed by the search result display unit 22 by using the display mechanism 20d, the search result operation unit 23 inputs information about the user operation to the search-result generation unit 15 and the search-result-tree generation unit 16 of the search server 10. Examples of a user operation include an operation of specifying a search scope from the search result tree, an operation of selecting multiple nodes so as to highlight a common ancestor node, and an operation of placing the pointer on a node in order to display the title of the page corresponding to the node.

Operations performed by the search system according to the present embodiment are roughly classified into an operation performed when pages on the Internet are collected to generate an index tree, and an operation performed when a search result tree is generated on the basis of information, such as the index tree and a received search word.

In this operation, the page collection unit 11 first collects pages from the Internet. Then, the index generation unit 12 analyzes the collected pages so as to generate an index in which a word and a URL are associated with each other, and stores the index into the index-information storage unit 14. The index generation unit 12 also extracts link information between the collected pages, and outputs the link information to the index-tree generation unit 13.

Figure 9:
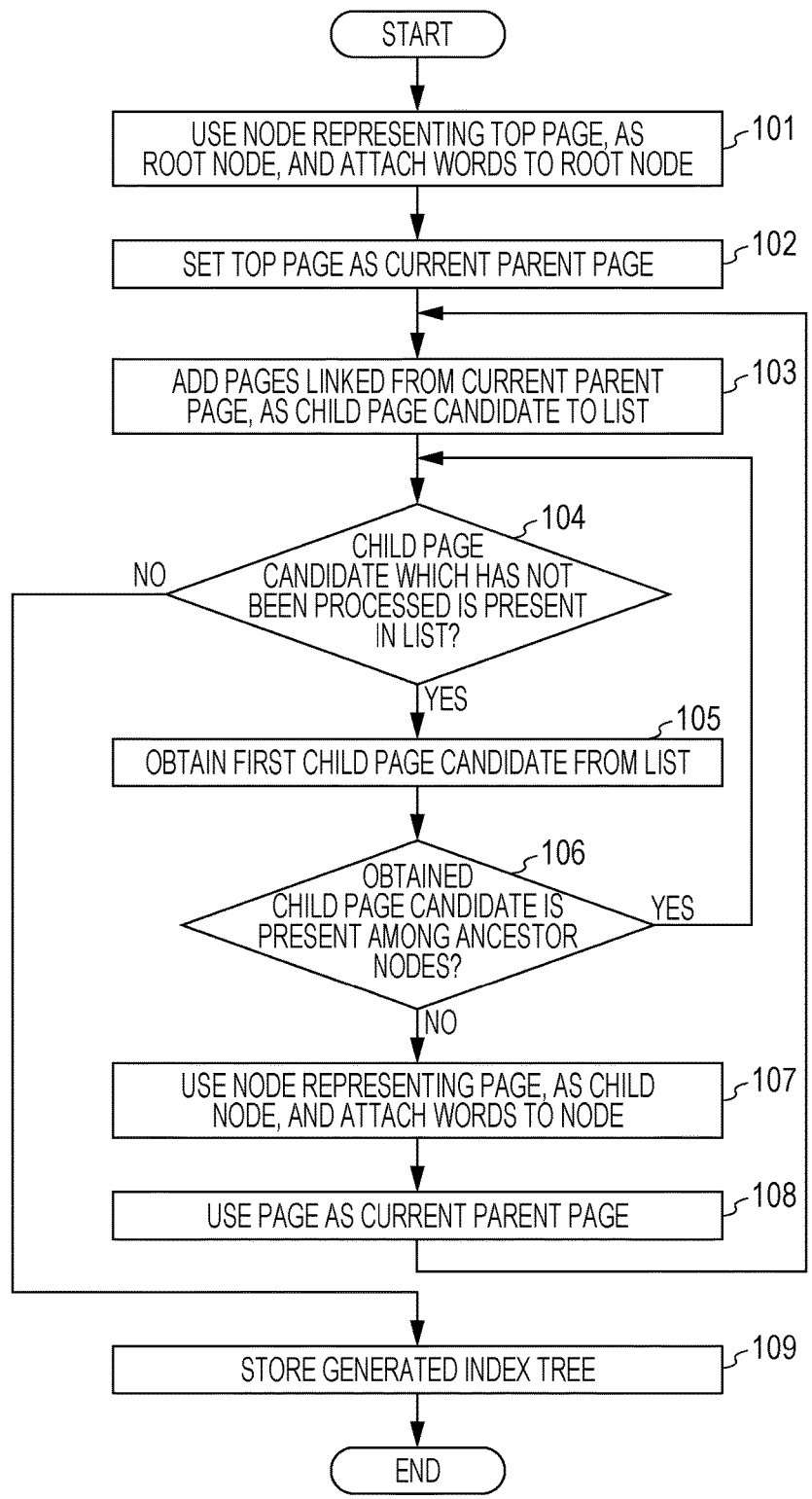
FIG. 9 is a flowchart of an example operation performed when the search system generates an index tree, according to an embodiment of the present invention.

FIG. 9 is a flowchart of an example operation performed by the index-tree generation unit 13 after that.

As illustrated in FIG. 9, the index-tree generation unit 13 adds a node representing a top page, as a root node to an index tree, and attaches words to the root node (in step 101). Information describing which page is the top page is included in the link information received from the index generation unit 12. As a word to be attached to the root node, a word associated with the URL of the top page in the index stored in the index-information storage unit 14 may be used. The index-tree generation unit 13 sets the top page as the current parent page (in step 102).

Then, the index-tree generation unit 13 adds pages linked from the current parent page, as a candidate of the page corresponding to a child node (child page candidate) to a list (in step 103). It is determined whether or not a child page candidate which has not been processed is present in the list (in step 104). If it is determined that a child page candidate which has not been processed is present, the first child page candidate is obtained from the list (in step 105). The index-tree generation unit 13 refers to the index tree which is already generated, and determines whether or not the node representing the obtained child page candidate is present among the ancestor nodes of the node representing the current parent page (in step 106). If it is determined that the node representing the child page candidate is present among the ancestor nodes, the index-tree generation unit 13 does not process the child page candidate, and determines whether or not another child page candidate which has not been processed is present in the list (in step 104).

If it is determined that the node representing the child page candidate is not present among the ancestor nodes, the index-tree generation unit 13 adds the node representing the child page candidate, as a child node of the node representing the current parent page, i.e., a node representing the child page, and attaches words to the node (in step 107). As a word to be attached to the node, a word associated to the URL of the child page in the index stored in the index-information storage unit 14 may be used. The index-tree generation unit 13 uses the child page as the current parent page (in step 108), and repeatedly performs step 103 and its subsequent steps.

In contrast, in step 104, if it is determined that a child page candidate which has not been processed is not present in the list, all of the pages collected by the page collection unit 11 have been processed. Therefore, the index-tree generation unit 13 stores the index tree generated so far, in the index-information storage unit 14 (in step 109).

In this operation, the search word input unit 21 of the client 20 inputs a search word to the search server 10. Thus, in the search server 10, the search-result generation unit 15 generates a search result, and outputs the search word to the search-result-tree generation unit 16.

Figure 10:
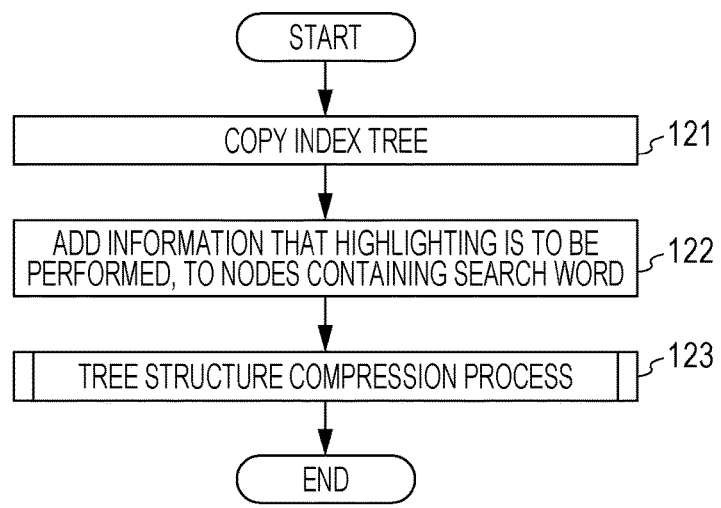
FIG. 10 is a flowchart of an example operation performed when the search system generates a search result tree, according to an embodiment of the present invention.

FIG. 10 is a flowchart of an example operation performed by the search-result-tree generation unit 16 after the above-described process.

As illustrated in FIG. 10, the search-result-tree generation unit 16 first copies the index tree stored in the index-information storage unit 14 to a memory which can be referred to by the search-result-tree generation unit 16 (in step 121). Then, the index-tree generation unit 13 adds information that highlighting is to be performed, to nodes containing the search word received from the search-result generation unit 15, among the nodes in the index tree (in step 122). Then, a tree structure compression process illustrated in FIGS. 5A to 5C is performed on the tree after the information that highlighting is to be performed is added (in step 123).

Figure 11A:
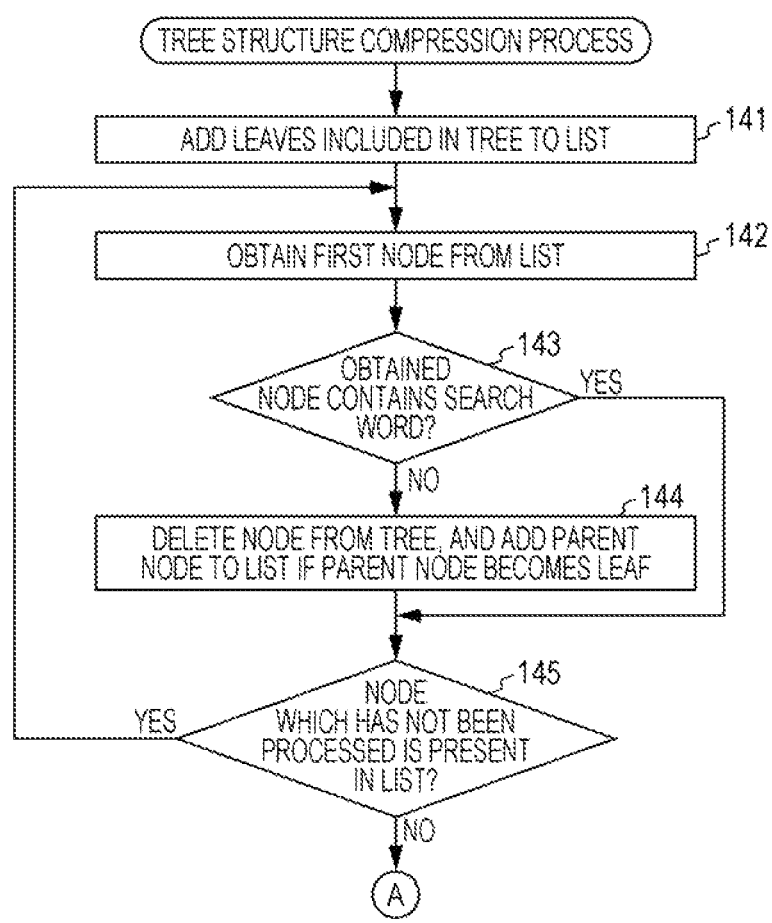
FIG. 11A is a flowchart of an example operation performed when the search system generates a search result tree, according to an embodiment of the present invention.
Figure 11B:
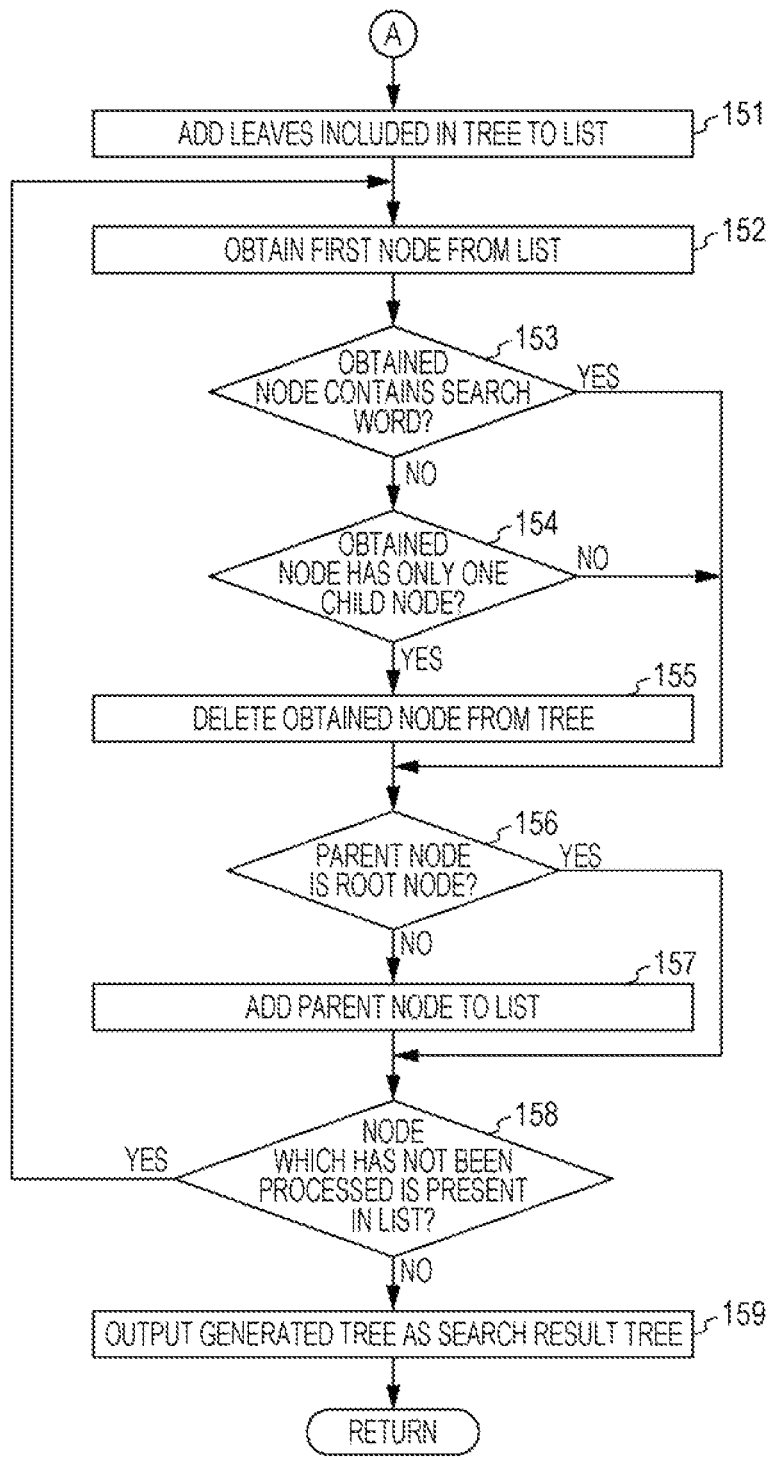
FIG. 11B is a flowchart of an example operation performed when the search system generates a search result tree, according to an embodiment of the present invention.

FIGS. 11A and 11B are flowcharts illustrating the flow of the tree structure compression process performed in step 123 in FIG. 10. FIG. 11A corresponds to a tree structure compression process in which leaves are deleted and which is a process of obtaining the tree in FIG. 5B from one in FIG. 5A. FIG. 11B corresponds to a tree structure compression process in which intermediate nodes are deleted and which is a process of obtaining the tree in FIG. 5C from one in FIG. 5B.

As illustrated in FIG. 11A, the search-result-tree generation unit 16 first adds all of the leaves included in the tree just after the information that highlighting is to be performed is added in step 122 in FIG. 10, to a list (in step 141). Then, the first node is obtained from the list (in step 142). The search-result-tree generation unit 16 determines whether or not the obtained node contains the search word (in step 143).

If it is determined that the obtained node does not contain the search word, the search-result-tree generation unit 16 deletes the node from the tree. If the parent node of the node becomes a leaf, the search-result-tree generation unit 16 adds the parent node to the list (in step 144). Then, it is determined whether or not a node which has not been processed is present in the list (in step 145). If it is determined that such a node is present, the processes in step 142 and its subsequent steps are repeatedly performed.

In step 143, if it is determined that the node contains the search word, the search-result-tree generation unit 16 does not delete the node, and proceeds to step 145. It is determined whether or not a node which has not been processed is present in the list (in step 145). If it is determined that such a node is present, the processes in step 142 and its subsequent steps are repeatedly performed.

If it is determined that a node which has not been processed is not present in the list, the tree structure compression process of deleting leaves is completed, and the tree structure compression process of deleting intermediate nodes is started.

As illustrated in FIG. 11B, the search-result-tree generation unit 16 adds all of the leaves included in the tree just after the leaves which do not contain the search word are deleted, to a list (in step 151). Then, the first node is obtained from the list (in step 152). The search-result-tree generation unit 16 determines whether or not the obtained node contains the search word (in step 153).

If it is determined that the obtained node does not contain the search word, the search-result-tree generation unit 16 determines whether or not the obtained node has only one child node (in step 154). If it is determined that the obtained node has only one child node, the search-result-tree generation unit 16 deletes the obtained node from the tree (in step 155), and the process proceeds to step 156.

If it is determined that the obtained node contains the search word in step 153, or if it is determined that the obtained node does not have only one child node in step 154, the search-result-tree generation unit 16 does not delete the obtained node, and proceeds to step 156.

Then, the search-result-tree generation unit 16 determines whether or not the parent node of the obtained node is the root node (in step 156). If it is determined that the parent node is not the root node, the search-result-tree generation unit 16 adds the parent node to the list (in step 157). It is determined whether or not a node which has not been processed is present in the list (in step 158). If it is determined that such a node is present, the processes in step 152 and its subsequent steps are repeatedly processed.

In step 156, if it is determined that the parent node of the obtained node is the root node, the search-result-tree generation unit 16 does not add the parent node to the list, and proceeds to step 158. It is determined whether or not a node which has not been processed is present in the list (in step 158). If it is determined that such a node is present, the processes in step 152 and its subsequent steps are repeatedly processed.

In contrast, if it is determined that a node which has not been processed is not present in the list, the tree structure compression process of deleting intermediate nodes is completed, and the tree thus generated is output as a search result tree to the client 20 (in step 159).

The client 20 displays the search result tree. At that time, a user selects multiple nodes of the search result tree, as illustrated in FIG. 6, thereby giving an instruction that an ancestor node which is the closest one among common ancestors of the selected nodes is to be highlighted. The search result operation unit 23 of the client 20 inputs information about the user operation indicating such an instruction, to the search-result-tree generation unit 16 of the search server 10.

Figure 12A:
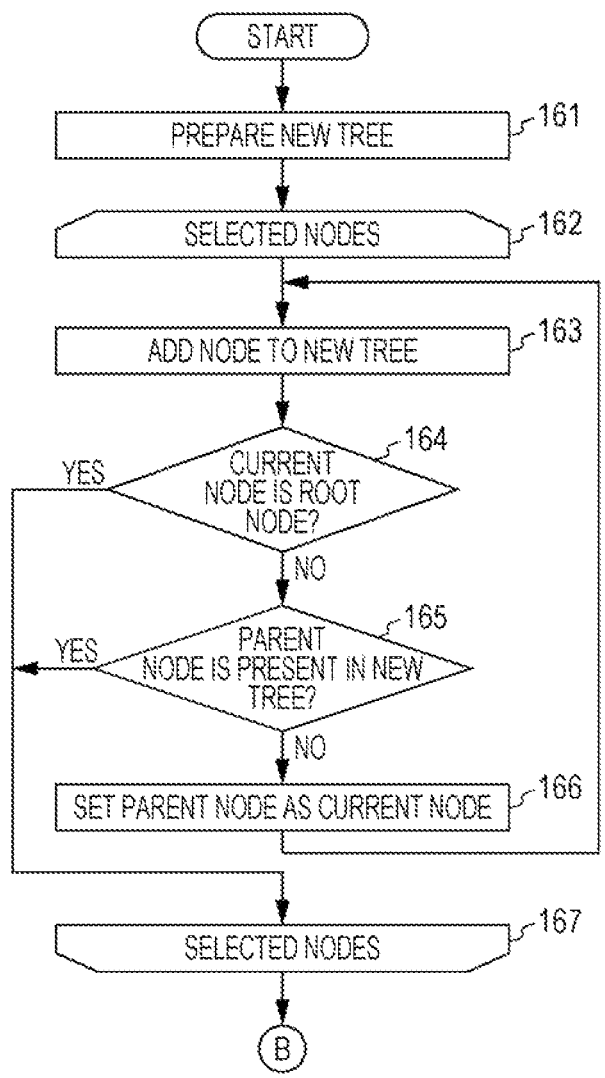
FIG. 12A is a flowchart of an example operation performed when the search system edits a search result tree, according to an embodiment of the present invention.
Figure 12B:
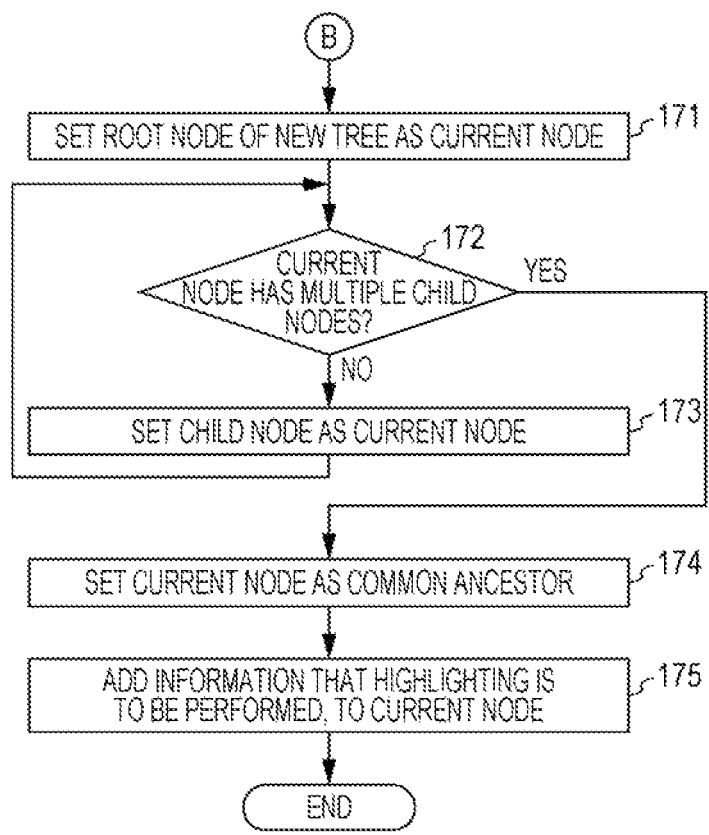
FIG. 12B is a flowchart of an example operation performed when the search system edits a search result tree, according to an embodiment of the present invention.

FIGS. 12A and 12B are flowcharts of an example operation performed by the search-result-tree generation unit 16 when the information about such a user operation is received.

As illustrated in FIG. 12A, the search-result-tree generation unit 16 first prepares a new tree (in step 161). A new tree is a target tree to which nodes are to be added. At this time point, the new tree has no nodes.

The search-result-tree generation unit 16 performs a loop from step 162 to step 167 for each selected node. That is, the search-result-tree generation unit 16 uses any one of the selected nodes as a current node, and adds this node to the new tree prepared in step 161 (in step 163). It is determined whether or not the current node is the root node (in step 164). If it is determined that the current node is the root node, the process proceeds to step 167, and the same processes are performed on a next node among the selected nodes.

If it is determined that the current node is not the root node, the search-result-tree generation unit 16 determines whether or not the parent node of the current node is present in the new tree (in step 165). If it is determined that the parent node of the current node is already present in the new tree, the process proceeds to step 167, and the same processes are performed on a next node among the selected nodes.

In contrast, in step 165, if it is determined that the parent node of the current node is not present in the new tree, the parent node is set as the current node (in step 166), and this node is added to the new tree prepared in step 161 (in step 163). Then, the processes in step 164 and its subsequent steps are repeatedly performed.

After the loop process from step 162 to step 167 is thus performed, as illustrated in FIG. 12B, the search-result-tree generation unit 16 sets the root node of the new tree as the current node (in step 171). It is determined whether or not the current node has multiple child nodes (in step 172). If it is determined that the current node does not have multiple child nodes, the search-result-tree generation unit 16 sets the child node of the current node as the current node (in step 173), and performs the determination in step 172.

When a node having multiple child nodes is set as the current node, the search-result-tree generation unit 16 determines that the current node has multiple child nodes in step 172, and sets the current node as the common ancestor (in step 174), and adds the information that highlighting is to be performed, to the node corresponding to the current node in the search result tree (in step 175).

Thus, when the search result tree is displayed on the client 20, a node which is set as the common ancestor in step 174 is highlighted.

As described above, in the present embodiment, a website represented in a network structure is converted into a representation in a tree structure. At that time, a page linked from multiple pages is represented as different nodes in a duplicated manner; nodes which are not related to a query are omitted; and a common ancestor node of nodes selected by a user is displayed. Thus, a page group of a user's interest may be specified from the pages in the website represented in a network structure while the intention of the author of the website is grasped.

In the present embodiment, it is assumed that the connection relationship among web pages is represented in a tree structure. However, the present invention is not limited to this. It may be assumed that any connection relationship among components, such as the relationship among users in an SNS, e.g., the relationship between a user and his/her follower, and the reference relationship among documents such as papers, is represented in a tree structure.

Figure 13:
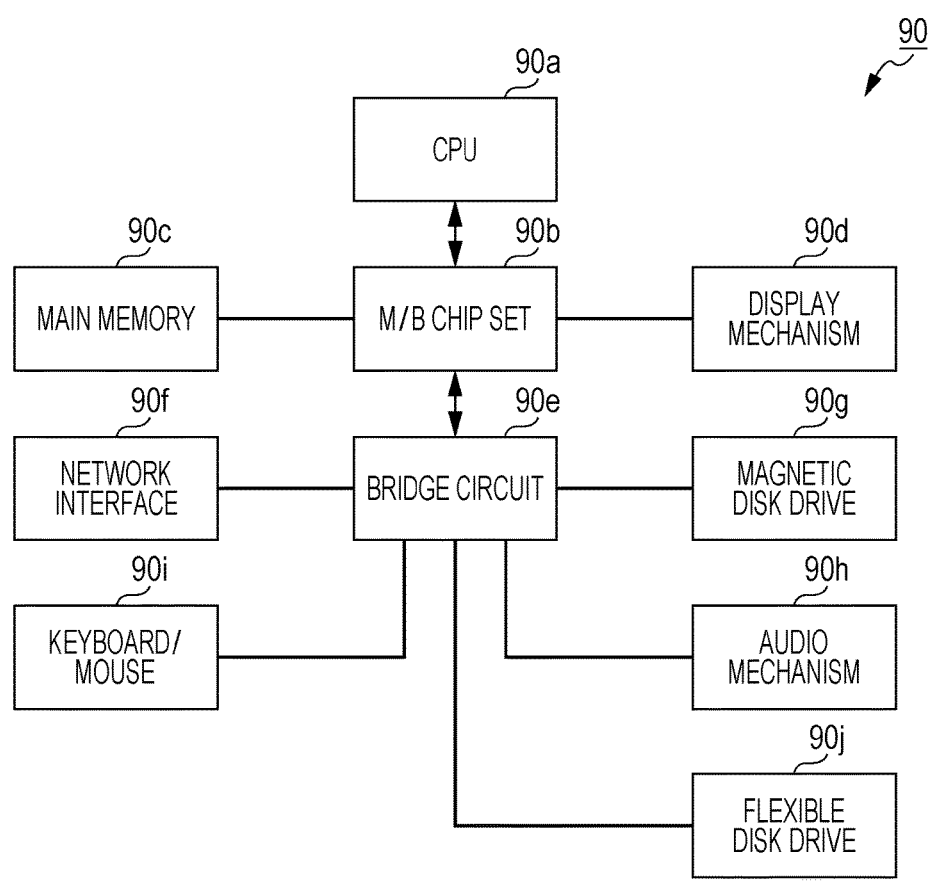
FIG. 13 is a diagram illustrating an example hardware configuration of a computer to which an embodiment of the present invention may be applied.

FIG. 13 is a diagram illustrating an example hardware configuration of a computer 90 used in the search system according to the present embodiment. As illustrated in FIG. 13, the computer 90 includes a central processing unit (CPU) 90a which is a calculating unit, a main memory 90c connected to the CPU 90a via a motherboard (M/B) chip set 90b, and a display mechanism 90d connected to the CPU 90a via the M/B chip set 90b. A network interface 90f, a magnetic disk drive (HDD) 90g, an audio mechanism 90h, a keyboard/mouse 90i, and a flexible disk drive 90j are connected to the M/B chip set 90b via a bridge circuit 90e.

In FIG. 13, each of the components is connected via a bus. For example, a CPU bus connects between the CPU 90a and the M/B chip set 90b and between the M/B chip set 90b and the main memory 90c. An accelerated graphics port (AGP) may connect between the M/B chip set 90b and the display mechanism 90d. When the display mechanism 90d includes a video card compatible with Peripheral Components Interconnect (PCI) Express, a PCI Express (PCIe) bus connects between the M/B chip set 90b and the video card. The bridge circuit 90e may be connected to the network interface 90f, for example, by using PCI Express. The bridge circuit 90e may be connected to the magnetic disk drive 90g, for example, by using Serial AT Attachment (ATA), ATA for parallel transfer, or PCI. The bridge circuit 90e may be connected to the keyboard/mouse 90i and the flexible disk drive 90j by using Universal Serial Bus (USB).

FIG. 13 illustrates the example hardware configuration of the computer 90. FIG. 13 may directly illustrate an example hardware configuration of the search server 10 illustrated in FIG. 8. In this case, the example hardware configuration of the search server 10 may include a CPU 10a, an M/B chip set 10b, a main memory 10c, a display mechanism 10d, a bridge circuit 10e, a network interface 10f, a magnetic disk drive 10g, an audio mechanism 10h, a keyboard/mouse 10i, and a flexible disk drive 10j. FIG. 13 may directly illustrate an example hardware configuration of the client 20 illustrated in FIG. 8. In this case, the example hardware configuration of the client 20 may include a CPU 20a, an M/B chip set 20b, a main memory 20c, a display mechanism 20d, a bridge circuit 20e, a network interface 20f, a magnetic disk drive 20g, an audio mechanism 20h, a keyboard/mouse 20i, and a flexible disk drive 20j.

The present invention may be achieved only by using hardware, or only by using software. The present invention may be achieved by using both of hardware and software. The present invention may be achieved as a computer, a data processing system, or a program product. The program product includes a computer program stored in a computer-readable medium so as to be provided. A medium may be an electronic medium, a magnetic medium, an optical medium, an electromagnetic medium, an infrared radiation or semiconductor system (apparatus or device), or a propagation medium. Examples of a computer-readable medium include a semiconductor, a solid-state storage, a magnetic tape, a removable computer diskette, a random-access memory (RAM), a read-only memory (ROM), a rigid magnetic disk, and an optical disk. Examples of an optical disk which are currently available include a compact disk-read-only memory (CD-ROM), a compact disk-read/write (CD-R/W), and a digital versatile disk (DVD).

As described above, the present invention is described by using the embodiment. The technical scope of the present invention is not limited to the above-described embodiment. It is clear to a person skilled in the art that various changes may be made or an alternative aspect may be employed without departing from the spirit and the scope of the present invention.

REFERENCE SIGNS LIST

10: search server
11: page collection unit
12: index generation unit
13: index-tree generation unit
14: index-information storage unith
15: search-result generation unit
16: search-result-tree generation unit
20: client
21: search word input unit
22: search result display unit
23: search result operation unit

What is claimed is:

1. A system for performing a search request and for supporting visualization of a link relationship among a plurality of web pages of a website, the system comprising:
a processing unit; and
a memory connected to the processing unit, wherein the processing unit is configured to perform:
collecting the plurality of web pages of the website;
extracting link information representing a link relationship among the plurality of web pages;
generating a tree structure based on the extracted link information, the tree structure including a plurality of nodes, each of which corresponds to a respective web page of the plurality of web pages, each of the nodes being associated with a respective uniform resource locator and at least one word associated with the respective uniform resource locator;
when two different nodes of the plurality of nodes of the generated tree structure have a same child node corresponding to a same one of the plurality of web pages, representing the same child node in the generated tree structure as a separate first duplicate child node of a first node of the two different nodes and a separate second duplicate child node of a second node of the two different nodes;
receiving a search request including a search word;
producing a search result tree based on the web pages, the generated tree structure and a search result of the search request; and
providing a representation of the search result tree to a display unit for displaying the search result tree, the displayed search result tree indicating which ones of the plurality of nodes correspond to ones of the plurality of web pages satisfying the search request, wherein:
the displayed search tree result provides information regarding an overall structure of the website, thereby facilitating a search for information related to the search result, and
representation of the same child node in the generated tree structure as the separate first duplicate child node and the separate second duplicate child node avoids overlapping flows in the presentation of the search result tree to facilitate comprehension of the overall structure of the website.

2. The system of claim 1, wherein the processing unit is further configured to perform:
deleting, from the search tree result, leaf nodes that do not satisfy the search request;
deleting, from the search tree result, intermediate nodes that do not satisfy the search request; and
providing information for updating the displayed search tree result.

3. The system of claim 2, wherein the deleting the leaf nodes that do not satisfy the search request further comprises:
adding leaf nodes from the search tree result to a list;
obtaining a node from the list;
determining whether the obtained node satisfies the search request;
deleting the obtained node from the search tree result when the obtained node does not satisfy the search result;
determining whether a parent node of the obtained node has become a leaf node in the search tree result;
adding the parent node to the list when the parent node has become the leaf node;
determining whether a node which has not been processed is included in the list; and
repeating the step of obtaining a node from the list through the step of repeating when the node which has not been processed is determined to be in the list.

4. The system of claim 3, wherein the deleting the intermediate nodes that do not satisfy the search request further comprises:
after performing the deleting, from the search tree result, the leaf nodes that do not satisfy the search request, performing:

adding remaining leaf nodes from the search tree result to a second list;
obtaining a node from the second list as a new current node;
determining whether the new current node satisfies the search request;
determining whether the new current node has only one child when the new current node does not satisfy the search request;
when the new current node is determined not to satisfy the search request and the new current node has only one child node, deleting the new current node from the search tree result;
determining whether a parent node of the new current node is a root node of the search tree result;
adding the parent node to the second list when the parent node is determined not to be the root node of the search tree result; and
when the second list includes a node that has not been processed, repeating the step of obtaining the new current node from the second list through a present step of the repeating.

5. The system of claim 1, wherein the processing unit is further configured to perform:
receiving a selection of multiple nodes of the plurality of nodes of the search tree result and an instruction indicating that a common ancestor node of the selected multiple nodes is to be highlighted;
preparing a new tree with no nodes;
performing, for each of the selected multiple nodes:
  adding a respective node of the selected multiple nodes to the new tree,
  setting a current node to the respective node,
  determining whether the current node is a root node of the search tree result, and
  repeating, while the current node is determined not to be the root node and a parent node of the current node is not present in the new tree:
    setting the parent node as the current node, and
    adding the current node to the new tree;
setting the root node of the new tree as the current node;
determining whether the current node has multiple child nodes;
repeating, while the current node does not have multiple child nodes:
  setting the child node as the current node, and
  determining whether the current node has multiple child nodes;
setting the current node as the common ancestor node; and
providing a representation of the new tree and information for highlighting the common ancestor node to a display for displaying.

6. The system of claim 1, wherein the processing unit is further configured to perform:
receiving a command for selecting a node group from the search result tree, the command including selection of a node from the search result tree corresponding to a web page of the plurality of web pages; and
in response to the receiving the command, narrowing a scope of the search request to ones of the web pages corresponding to the selected node and all descendent nodes of the selected node.

7. The system of claim 6, wherein the processing unit is further configured to perform:
receiving a new search request; and
producing a new search tree result having the narrowed scope with respect to the search request.

8. A computer-implemented method for performing a search and supporting visualization of a link relationship among a plurality of web pages of a website, the computer-implemented method comprising:
collecting the plurality of web pages of the website;
extracting link information representing a link relationship among the plurality of web pages;
generating a tree structure based on the extracted link information, the tree structure including a plurality of nodes, each of which corresponds to a respective web page of the plurality of web pages, each of the nodes being associated with a respective uniform resource locator and at least one word associated with the respective uniform resource locator;
when two different nodes of the plurality of nodes of the generated tree structure have a same child node corresponding to a same one of the plurality of web pages, representing the same child node in the generated tree structure as a separate first duplicate child node of a first node of the two different nodes and a separate second duplicate child node of a second node of the two different nodes;
receiving a search request including a search word;
producing a search result tree based on the web pages, the generated tree structure and a search result of the search request; and
providing a representation of the search result tree to a display unit for displaying the search result tree, the displayed search result tree indicating which ones of the plurality of nodes correspond to ones of the plurality of web pages satisfying the search request,
wherein:
the displayed search tree result provides information regarding an overall structure of the website, thereby facilitating a search for information related to the search result, and
representation of the same child node in the generated tree structure as the separate first duplicate child node and the separate second duplicate child node avoids overlapping flows in the presentation of the search result tree to facilitate comprehension of the overall structure of the website.

9. The computer-implemented method of claim 8, further comprising:
deleting, from the search tree result, leaf nodes that do not satisfy the search request;
deleting, from the search tree result, intermediate nodes that do not satisfy the search request; and
providing information for updating the displayed search tree result.

10. The computer-implemented method of claim 9, wherein the deleting the leaf nodes that do not satisfy the search request further comprises:
adding leaf nodes from the search tree result to a list;
obtaining a node from the list;
determining whether the obtained node satisfies the search request;
deleting whether the obtained node from the search tree result when the obtained node does not satisfy the search result;
determining whether a parent node of the obtained node has become a leaf node in the search tree result;
adding the parent node to the list when the parent node has become the leaf node;

determining whether a node which has not been processed is included in the list; and repeating the step of obtaining a node from the list through the step of repeating when the node which has not been processed is determined to be in the list.

11. The computer-implemented method of claim 10, wherein the deleting the intermediate nodes that do not satisfy the search request further comprises:

after performing the deleting, from the search tree result, the leaf nodes that do not satisfy the search request, performing:

adding remaining leaf nodes from the search tree result to a second list;

obtaining a node from the second list as a new current node;

determining whether the new current node satisfies the search request;

determining whether the new current node has only one child when the new current node does not satisfy the search request;

when the new current node is determined not to satisfy the search request and the new current node has only one child node, deleting the new current node from the search tree result;

determining whether a parent node of the new current node is a root node of the search tree result;

adding the parent node to the second list when the parent node is determined not to be the root node of the search tree result; and when the second list includes a node that has not been processed, repeating the step of obtaining the new current node from the second list through a present step of the repeating.

12. The computer-implemented method of claim 8, further comprising:

receiving a selection of multiple nodes of the plurality of nodes of the search tree result and an instruction indicating that a common ancestor node of the selected multiple nodes is to be highlighted;

preparing a new tree with no nodes;

performing, for each of the selected multiple nodes:

adding a respective node of the selected multiple nodes to the new tree, setting a current node to the respective node, determining whether the current node is a root node of the search tree result, and repeating, while the current node is determined not to be the root node and a parent node of the current node is not present in the new tree:

setting the parent node as the current node, and adding the current node to the new tree;

setting the root node of the new tree as the current node;

determining whether the current node has multiple child nodes;

repeating, while the current node does not have multiple child nodes:

setting the child node as the current node, and determining whether the current node has multiple child nodes;

setting the current node as the common ancestor node; and providing a representation of the new tree and information for highlighting the common ancestor node to a display for displaying.

13. The computer-implemented method of claim 8, further comprising:

receiving a command for selecting a node group from the search result tree, the command including selection of a node from the search result tree corresponding to a web page of the plurality of web pages; and in response to the receiving the command, narrowing a scope of the search request to ones of the web pages corresponding to the selected node and all descendent nodes of the selected node.

14. A computer program product for performing a search and supporting visualization of a link relationship among a plurality of web pages of a website, the computer program product comprising:

a computer readable storage medium having computer readable program code embodied therewith for execution on a processing system, the computer readable program code comprising computer executable instructions configured to be executed by the processing system to perform:

collecting the plurality of web pages of the website;

extracting link information representing a link relationship among the plurality of web pages;

generating a tree structure based on the extracted link information, the tree structure including a plurality of nodes, each of which corresponds to a respective web page of the plurality of web pages, each of the nodes being associated with a respective uniform resource locator and at least one word associated with the respective uniform resource locator;

when two different nodes of the plurality of nodes of the generated tree structure have a same child node corresponding to a same one of the plurality of web pages, representing the same child node in the generated tree structure as a separate first duplicate child node of a first node of the two different nodes and a separate second duplicate child node of a second node of the two different nodes;

receiving a search request including a search word;

producing a search result tree based on the web pages, the generated tree structure and a search result of the search request; and providing a representation of the search result tree to a display unit for displaying the search result tree, the displayed search result tree indicating which ones of the plurality of nodes correspond to ones of the plurality of web pages satisfying the search request, wherein:

the displayed search tree result provides information regarding an overall structure of the website, thereby facilitating the search for information related to a search result, and representation of the same child node in the generated tree structure as the separate first duplicate child node and the separate second duplicate child node avoids overlapping flows in the presentation of the search result tree to facilitate comprehension of the overall structure of the website.

15. The computer program product of claim 14, wherein the computer executable instructions are further configured to be executed by the processing system to perform:

deleting, from the search tree result, leaf nodes that do not satisfy the search request;

deleting, from the search tree result, intermediate nodes that do not satisfy the search request; and providing information for updating the displayed search tree result.

16. The computer program product of claim 15, wherein the deleting the leaf nodes that do not satisfy the search request further comprises:
    adding leaf nodes from the search tree result to a list;
    obtaining a node from the list;
    determining whether the obtained node satisfies the search request;
    deleting whether the obtained node from the search tree result when the obtained node does not satisfy the search result;
    determining whether a parent node of the obtained node has become a leaf node in the search tree result;
    adding the parent node to the list when the parent node has become the leaf node;
    determining whether a node which has not been processed is included in the list; and
    repeating the step of obtaining a node from the list through the step of repeating when the node which has not been processed is determined to be in the list.

17. The computer program product of claim 16, wherein the deleting the intermediate nodes that do not satisfy the search request further comprises:
    after performing the deleting, from the search tree result, the leaf nodes that do not satisfy the search request, performing:
        adding remaining leaf nodes from the search tree result to a second list;
        obtaining a node from the second list as a new current node;
        determining whether the new current node satisfies the search request;
        determining whether the new current node has only one child when the new current node does not satisfy the search request;
        when the new current node is determined not to satisfy the search request and the new current node has only one child node, deleting the new current node from the search tree result;
        determining whether a parent node of the new current node is a root node of the search tree result;
        adding the parent node to the second list when the parent node is determined not to be the root node of the search tree result; and
        when the second list includes a node that has not been processed, repeating the step of obtaining the new current node from the second list through a present step of the repeating.

18. The computer program product of claim 14, wherein the computer executable instructions are further configured to be executed by the processing system to perform:
    receiving a selection of multiple nodes of the plurality of nodes of the search tree result and an instruction indicating that a common ancestor node of the selected multiple nodes is to be highlighted;
    preparing a new tree with no nodes;
    performing, for each of the selected multiple nodes:
        adding a respective node of the selected multiple nodes to the new tree,
        setting a current node to the respective node,
        determining whether the current node is a root node of the search tree result, and
        repeating, while the current node is determined not to be the root node and a parent node of the current node is not present in the new tree:
            setting the parent node as the current node, and
            adding the current node to the new tree;
    setting the root node of the new tree as the current node;
    determining whether the current node has multiple child nodes;
    repeating, while the current node does not have multiple child nodes:
        setting the child node as the current node, and
        determining whether the current node has multiple child nodes;
    setting the current node as the common ancestor node; and
    providing a representation of the new tree and information for highlighting the common ancestor node to a display for displaying.

19. The computer program product of claim 14, wherein the computer executable instructions are further configured to be executed by the processing system to perform:
    receiving a command for selecting a node group from the search result tree, the command including selection of a node from the search result tree corresponding to a web page of the plurality of web pages; and
    in response to the receiving the command, narrowing a scope of the search request to ones of the web pages corresponding to the selected node and all descendent nodes of the selected node.

20. The computer program product of claim 19, wherein the computer executable instructions are further configured to be executed by the processing system to perform:
    receiving a new search request;
    producing a new search tree result having the narrowed scope with respect to the search request.

* * * * *